(12) United States Patent
Min et al.

(10) Patent No.: US 7,787,208 B2
(45) Date of Patent: Aug. 31, 2010

(54) BIT PATTERNED MEDIUM HAVING SUPER-TRACK, METHOD OF TRACKING TRACK OF BIT PATTERNED MEDIUM, HEAD APPROPRIATE FOR BIT PATTERNED MEDIUM, AND INFORMATION RECORDING/REPRODUCING APPARATUS INCLUDING BIT PATTERNED MEDIUM HEAD

(75) Inventors: Dong-ki Min, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/111,217

(22) Filed: Apr. 29, 2008

(65) Prior Publication Data
US 2009/0103204 A1 Apr. 23, 2009

(30) Foreign Application Priority Data
Oct. 23, 2007 (KR) ...................... 10-2007-0106738

(51) Int. Cl.
*G11B 5/596* (2006.01)
(52) U.S. Cl. .................... 360/77.02; 360/48; 360/77.08; 360/135; 428/826
(58) Field of Classification Search ........................ None
See application file for complete search history.

(56) References Cited

U.S. PATENT DOCUMENTS

| | | | | |
|---|---|---|---|---|
| 6,162,532 A | * | 12/2000 | Black et al. ................. | 428/323 |
| 6,643,082 B1 | * | 11/2003 | Belser .......................... | 360/48 |
| 6,977,108 B2 | * | 12/2005 | Hieda et al. ................. | 428/64.2 |
| 2006/0061900 A1 | * | 3/2006 | Ohtsuka et al. ............... | 360/69 |
| 2006/0285257 A1 | * | 12/2006 | Albrecht et al. ............. | 360/319 |
| 2008/0002269 A1 | * | 1/2008 | Sakurai et al. ................ | 360/48 |
| 2008/0304173 A1 | * | 12/2008 | Albrecht et al. ............... | 360/51 |
| 2009/0059412 A1 | * | 3/2009 | Erden et al. .................... | 360/75 |
| 2009/0067090 A1 | * | 3/2009 | Ling et al. ................... | 360/135 |

\* cited by examiner

*Primary Examiner*—Jason C Olson
(74) *Attorney, Agent, or Firm*—Sughrue Mion, PLLC

(57) ABSTRACT

Provided are a bit patterned medium having a super-track, a method of tracking a track of the bit patterned medium, a head appropriate for the bit patterned medium, and an information recording/reproducing apparatus including the bit patterned medium and the head. The bit patterned medium includes a substrate, and a recording layer comprised of a plurality of bit cells which are formed on the substrate by being separated from each other, along a plurality of tracks. Each of the plurality of tracks includes a super-track comprised of a plurality of sub-tracks. Bit cells formed on a sub-track from among the plurality of sub-tracks in the super-track are disposed so as to deviate from bit cells formed on another sub-track from among the plurality of sub-tracks in the super-track. A track ID (identification) for recognizing the super-track, and a servo burst generating a position error signal when a head tracks the super-track, are arranged in an area of each of the plurality of tracks. Meanwhile, the head includes a writing head recording information in units of sub-tracks, and a reading sensor reproducing the information in units of super-tracks.

23 Claims, 13 Drawing Sheets

BIT PATTERNED MEDIUM HAVING SUPER-TRACK, METHOD OF TRACKING TRACK OF BIT PATTERNED MEDIUM, HEAD APPROPRIATE FOR BIT PATTERNED MEDIUM, AND INFORMATION RECORDING/REPRODUCING APPARATUS INCLUDING BIT PATTERNED MEDIUM HEAD

CROSS-REFERENCE TO RELATED PATENT APPLICATION

This application claims the benefit of Korean Patent Application No. 10-2007-0106738, filed on Oct. 23, 2007, in the Korean Intellectual Property Office, the disclosure of which is incorporated herein in its entirety by reference.

BACKGROUND OF THE INVENTION

1. Field of the Invention

The present invention relates to a bit patterned medium having a super-track, a method of tracking a track of the bit patterned medium, a head appropriate for the bit patterned medium, and an information recording/reproducing apparatus including the bit patterned medium and the head.

2. Description of the Related Art

Since society has been rapidly developing toward becoming an industrial and information society, the amount of information to be processed has sharply increased, and thus, there is a demand for information recording/reproducing apparatuses to have high densities.

In particular, hard disk drives (HDDs) have characteristics such as large storage capacity and fast access time. Accordingly, the HDDs have been highlighted as information recording devices for various digital devices, as well as computers. The HDDs use a magnetic recording method or an electric recording method, so as to record/reproduce information.

The magnetic recording method applies a magnetic field and magnetizes a magnetic layer of a recording medium, thereby recording the information and allowing the information to be reproduced by a magnetic signal of the magnetized magnetic layer. In the case of a longitudinal magnetic recording method, whereby the information is recorded based on the fact that a magnetization direction of the magnetic layer is parallel to a surface of the magnetic layer, a recording density of 100 Gb/in$^2$ is realized. A perpendicular magnetic recording method, whereby the information is recorded based on the fact that the magnetization direction of the magnetic layer is perpendicular to the surface of the magnetic layer, is more advantageous than the longitudinal magnetic recording method in view of the recording density, and realizes a recording density of over 500 Gb/in$^2$.

An electric field recording method records and reproduces information by using an electric field instead of the magnetic field, and in this regard, much research is being conducted. The electric field recording method polarizes a ferroelectric layer of a recording medium by using the electric field, thereby recording the information and reproducing the information by using an electric signal of the polarized ferroelectric layer. The electric field recording method can realize a high recording density of over 1 Tb/in$^2$.

An increase in the recording density by using any one of the aforementioned recording methods causes a decrease in the size of a bit which is a minimum unit for recording information, and weakens a signal generated from the recording medium. In order to solve these problems, research is being conducted, wherein the research is about increasing the recording density by using a patterned medium so that a signal to noise ratio (SNR) can be maintained high by reducing noise in the recording medium.

In the patterned medium, a recording layer, in which information is recorded, is patterned by a bit cell that is a unit for recording the information. For example, in the case of a magnetic recording medium, a magnetic body forming the recording layer is patterned by a plurality of bit cells. In the case of an electric field recording medium, a ferroelectric material forming the recording layer is patterned by a plurality of bit cells.

SUMMARY OF THE INVENTION

The present invention provides a bit patterned medium having servo information for tracking a track for each super-track including a plurality of sub-tracks, a method of tracking a track of the bit patterned medium, a head appropriate for the bit patterned medium, and an information recording/reproducing apparatus including the bit patterned medium and the head.

According to an aspect of the present invention, there is provided a bit patterned medium including a substrate; and a recording layer comprised of a plurality of bit cells which are formed on the substrate by being separated from each other, along a plurality of tracks; wherein each of the plurality of tracks comprises a super-track comprised of a plurality of sub-tracks, wherein bit cells formed on a sub-track from among the plurality of sub-tracks in the super-track are disposed so as to deviate from bit cells formed on another sub-track from among the plurality of sub-tracks in the super-track, and wherein a track ID (identification) for recognizing the super-track, and a servo burst generating a position error signal when a head tracks the super-track, are arranged in an area of each of the plurality of tracks.

According to another aspect of the present invention, there is provided a method of tracking a track by a bit patterned medium with respect to a head recording information in the bit patterned medium including a super-track and reproducing the recorded information, the method including operations of detecting the track ID and recognizing a super-track in which the head is positioned; detecting a position error signal from a servo burst; and performing a tracking control of the head by using the position error signal.

According to another aspect of the present invention, there is provided a head recording information in a bit patterned medium including a super-track and reading the recorded information, the head including a writing head recording the information by a unit of a sub-track; and a reading sensor reproducing the information by a unit of the super-track.

According to another aspect of the present invention, there is provided an information recording/reproducing apparatus including a bit patterned medium; a head comprising a writing head recording information in the bit patterned medium in units of sub-tracks and a reading sensor reproducing information in the bit patterned medium in units of super-tracks; and a control unit controlling the head whereby the head is positioned in a center line of the sub-track during recording and the head is positioned in a center line of the super-track during reproduction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
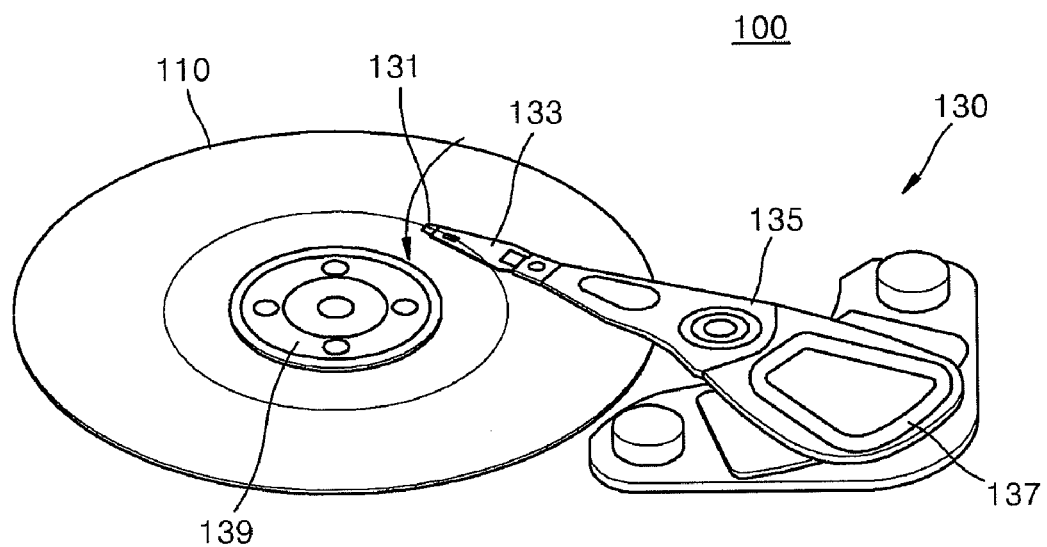
FIG. 1 is a diagram for schematically illustrating a structure of an information recording/reproducing apparatus according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses of layers and regions are exaggerated for clarity.

A bit patterned medium, a head, and an information recording/reproducing apparatus including the bit patterned medium and the head will now be described with reference to FIGS. 1 through 4.

Figure 2:
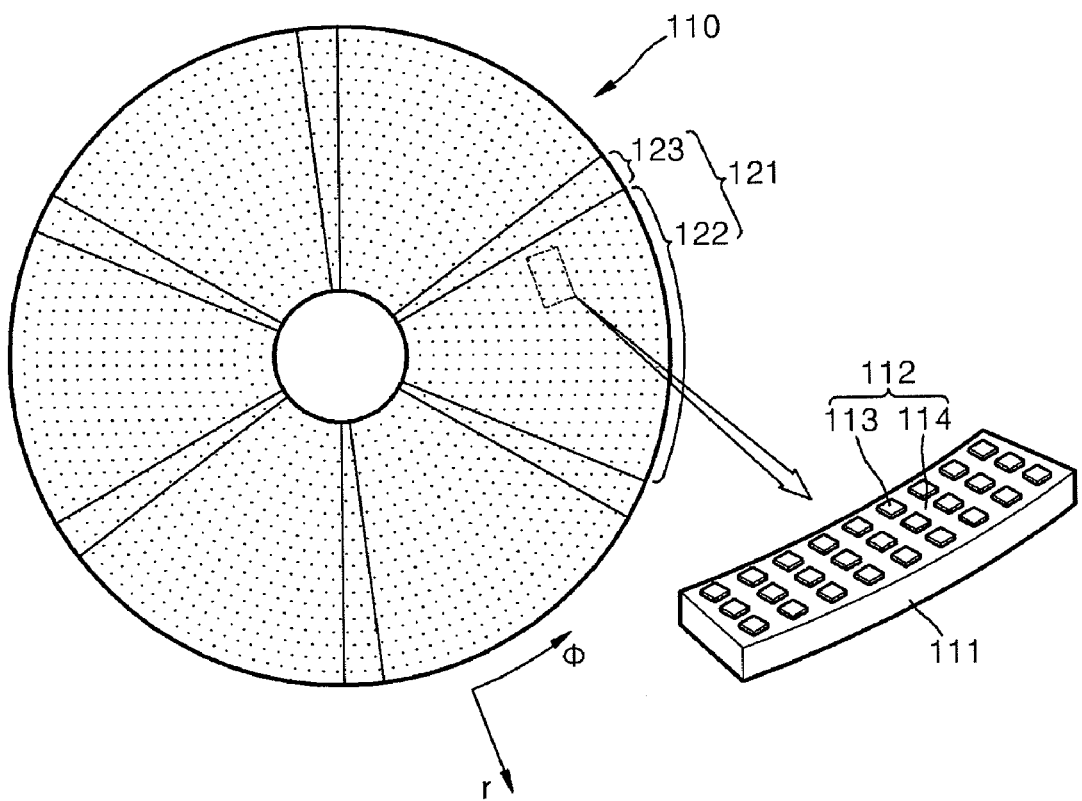
FIG. 2 is a structure of a bit patterned medium to be employed in the information recording/reproducing apparatus of FIG. 1.
Figure 3:
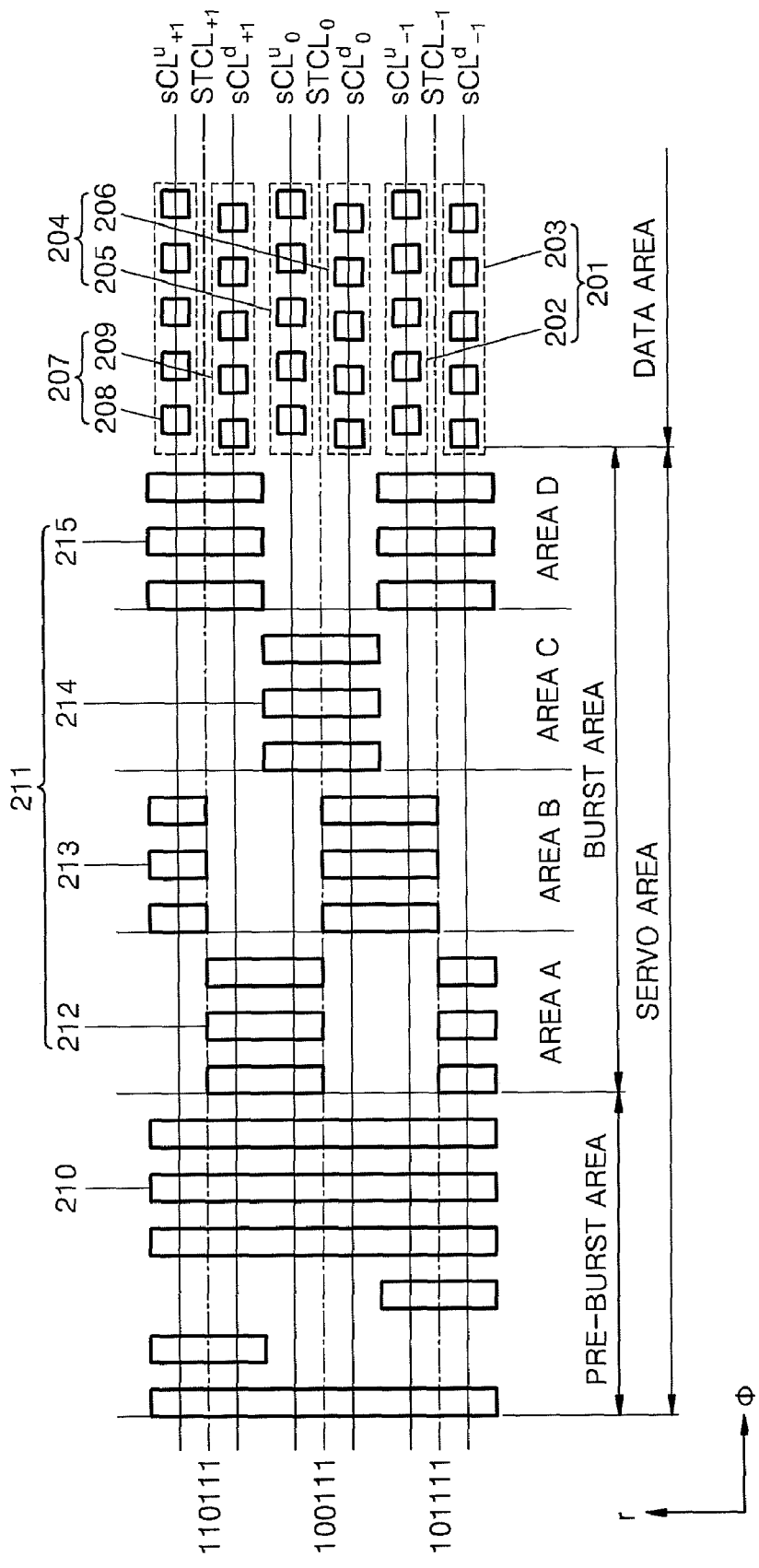
FIG. 3 is a diagram for illustrating a servo area and a data area, which are of the bit patterned medium of FIG. 2.
Figure 4:
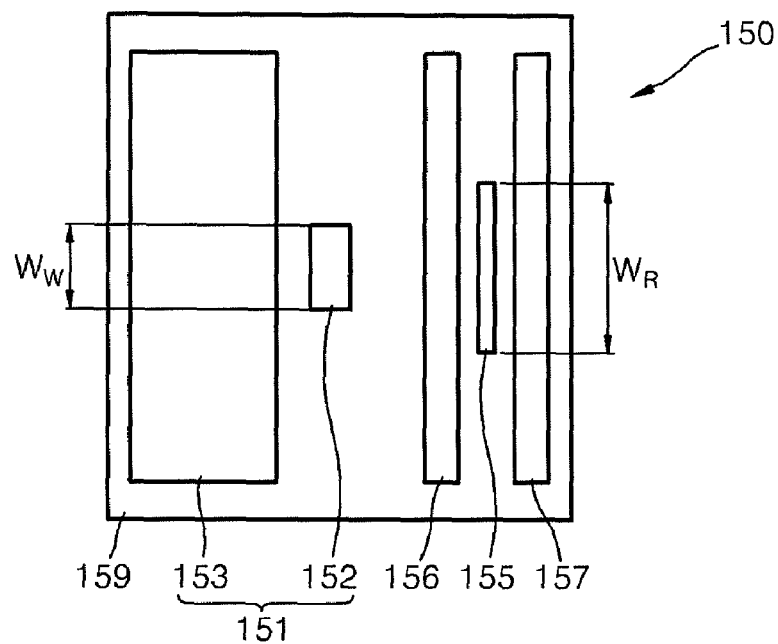
FIG. 4 is a diagram of a head to be employed in the information recording/reproducing apparatus of FIG. 1, where the head is viewed from an air bearing surface.

FIG. 1 is a diagram for schematically illustrating a structure of an information recording/reproducing apparatus 100 according to an embodiment of the present invention. FIG. 2 is a structure of a bit patterned medium 110 to be employed in the information recording/reproducing apparatus 100. FIG. 3 is a diagram for illustrating a servo area and a data area, which are of the bit patterned medium 110. FIG. 4 is a diagram of a head 150 to be employed in the information recording/reproducing apparatus 100, where the head 150 is viewed from an air bearing surface 159.

Referring to FIG. 1, the information recording/reproducing apparatus 100 includes the bit patterned medium 110, a driving unit which drives the bit patterned medium 110, and an actuator 130 having installed thereon the head 150 (refer to FIG. 4) which records information in the bit patterned medium 110 or reproduces the recorded information. The actuator 130 includes an actuator arm 135 and a suspension 133 which is arranged at a position extended from the actuator arm 135. A slider 131 having installed thereon the head 150 is attached on an end portion of the suspension 133 which is driven by a voice coil motor (VCM) 137.

Referring to FIG. 2, the bit patterned medium 110 according to the current embodiment includes a substrate 111 and a recording layer 112 formed on the substrate 111.

The substrate 111 may be made of a glass, an aluminum-based alloy, or the like, and has a disk shape. The recording layer 112 is formed on the substrate 111, and is comprised of a plurality of bit cells 113 and a plurality of separation areas 114. The recording layer 112, in particular, the plurality of bit cells 113 may be made of a magnetic material or a ferroelectric material. For example, the recording layer 112 is formed by patterning a magnetic body thin film or a magnetic body multi-layered thin film, which includes at least one of Co, Fe, Pt, and Pd which have a high magnetic anisotropy characteristic. The recording layer 112 may be used as a recording medium which records information by using a magnetic recording/reproducing method. In this case, the plurality of bit cells 113 are made of the magnetic material, and the plurality of separation areas 114 for magnetically separating each of the plurality of cells 113 may be empty or filled with a non-magnetic material. Also, the recording layer 112 may be formed by patterning a ferroelectric thin film such as $PbZr_xTi_{1-x}O_3$(PZT), $PbTiO_3$, $PbZrO_3$, $SrBi_2Ta_2O_9$(SBT), $KNbO_3$, $LiTaO_3$, $LiNbO_3$ and the like, and may be used as a recording medium which records information by using an electric field recording/reproducing method. In this case, the plurality of bit cells 113 are made of the ferroelectric material, and the plurality of separation areas 114 for electrically separating each of the plurality of cells 113 may be empty or filled with an insulating material. A protective film (not shown) for protecting the recording layer 112 from the exterior may be arranged on the recording layer 112. Also, a lubrication film (not shown) for reducing abrasion of the protective film may be further arranged. In addition, various layers for enhancing determinism of the recording layer 112 or for inhibiting a noise may be further arranged on the substrate 111.

The bit patterned medium 110 is installed in a spindle motor (not shown) and is rotationally driven in a circular direction (Φ), so as to record and reproduce information. Thus, a plurality of tracks forming concentric circles having different radiuses are formed on the bit patterned medium 110, and the plurality of bit cells 113 are formed along the plurality of tracks. At this time, a downtrack direction is the circular direction (Φ), and a crosstrack direction is a radial direction (r).

An information surface of the bit patterned medium 110 may be divided into a plurality of sectors 121 which may respectively have a data area 122 and a servo area 123. In the data area 122, sub-tracks comprised of the plurality of bit cells 113 are grouped into a super-track. In the servo area 123, servo information for tracking the sub-tracks and the super-track is recorded. In the current embodiment, the servo area 123 is arranged in each of the plurality of sectors 121. However, the present invention is not limited thereto and the servo area 123 may be arranged in only some of the plurality of sectors 121.

In FIG. 3, examples of the data area 122 and the servo area 123 are illustrated. Referring to FIG. 3, the data area 122 (refer to FIG. 2) includes a plurality of super-tracks 201, 204, and 207. Each of the super-tracks 201, 204, and 207 may include each of upper sub-tracks 202, 205, and 208, and each of lower sub-tracks 203, 206, and 209. Here, terms "upper" and "lower" are used for convenience of description with respect to the diagram, but the present invention is not limited thereto. The upper and lower sub-tracks 202, 203, 205, 206, 208, and 209 are comprised of rows of the plurality of bit cells 113. Each of the upper and lower sub-tracks 202, 203, 205, 206, 208, and 209 may be equiangularly formed in the radial direction (r). In the current embodiment, each of the super-tracks 201, 204, and 207 includes two sub-tracks. However, the present invention is not limited thereto, and each of the super-tracks 201, 204 according to the present invention may include more than two sub-tracks. In FIG. 3, only three of the super-tracks 201, 204, and 207 are illustrated for convenience of description. A center line for each of the super-tracks 201, 204, and 207 is denoted as $STCL_{-1}$, $STCL_0$, and $STCL_{+1}$. A center line for each of sub-tracks 202, 203, 205, 206, 208, and 209 is denoted as $sCL^u_{-1}$, $sCL^d_{-1}$, $sCL^u_0$, $sCL^d_0$, $sCL^u_{+1}$, and $sCL^d_{+1}$. The super-track 201 having the center line $STCL_{-1}$ is referred to as $-1_{th}$ super-track, the super-track 204 having the center line $STCL_0$ is referred to as $0_{th}$ super-track, and the super-track 207 having the center line $STCL_{+1}$ is referred to as $+1_{th}$ super-track. A detailed arrangement related to the plurality of bit cells 113 will be described later.

The servo area 123 (refer to FIG. 2) includes a pre-burst area and a burst area. A track identification (ID) 210 is formed in the pre-burst area. Information about the super-tracks 201, 204, and 207 is written in the track ID 210 which may be denoted by using gray code. For example, as illustrated in FIG. 3, the track ID 210 of each of the super-tracks 201, 204, and 207 is sequentially 101111, 100111, and 110111 in the radial direction (r). In the servo area 123, along with the track ID 210, preamble auto gain control (AGC), timing sync, information about one turn of a disk or information about a sector may be written. The preamble AGC is provided to determine a gain by considering a constant timing margin and gain control, by providing a gap before the servo area 123. The timing sync indicates a start of the servo area 123. Such information written in the pre-burst area may be formed together with a burst pattern in a manufacturing procedure for the bit patterned medium 110, and may be embedded in the pre-burst area.

The burst area is divided into an area A, area B, area C, and area D, in the downtrack direction. A servo burst 211 is written in each of area A, area B, area C, and area D. For example, an A burst 212 written in area A is formed to have a phase difference of 90 degrees in the radial direction (r) with respect to the $0_{th}$ super-track 204. A B burst 213 written in area B is formed to have a phase difference of −90 degrees in the radial direction (r) with respect to the $0_{th}$ super-track 204. A C burst 214 written in area C is formed to have a phase difference of 0 degrees in the radial direction (r) with respect to the $0_{th}$ super-track 204. A D burst 215 written in area D is formed to have a phase difference of 180 degrees in the radius direction (r) with respect to the $0_{th}$ super-track 204. That is, the A burst 212 is disposed between the $0_{th}$ super-track 204 and the $+1_{th}$ super-track 207. The B burst 213 is disposed between the $0_{th}$ super-track 204 and the $-1_{th}$ super-track 201. The C burst 214 is disposed to be parallel to the $0_{th}$ super-track 204. The D burst 215 is disposed to completely deviate from the $0_{th}$ super-track 204. Such a burst pattern is described with reference to three of the super-tracks 201, 204, and 207 but may be repeatedly formed in the radial direction (r). For example, the A burst 212 may be formed between the $-1_{th}$ super-track 201 and $-2_{th}$ super-track (not shown). The C burst 213 may be formed between the $+1_{th}$ super-track 207 and $+2_{th}$ super-track (not shown). The D burst 215 may be disposed to be parallel to the $-1_{th}$ super-track 201. That is, a period of the burst pattern according to the current embodiment repeating in the radial direction (r) is twice as wide as a super-track. A width of each of the A, B, C, and D bursts 212, 213, 214, and 215 may be formed to be the same as a width of each of the super-tracks 201, 204, and 207. A pattern of such a servo burst 211 is similar to a burst pattern about a common track, but is different from the burst pattern about the common track in that the pattern is formed with respect to the super-track.

Next, the head 150 appropriate for the bit patterned medium 110 will now be described with reference to FIG. 4. The air bearing surface 159 of the head 150 is illustrated in FIG. 4, and an effective recording width and an effective reproducing width, which are of the head 150, are described with reference to FIG. 4. Here, the air bearing surface 159 of the head 150 is a surface that faces the bit patterned medium 110 (refer to FIG. 1). The head 150 includes a writing head 151 for recording information in units of sub-tracks, and a reading sensor 155 reproducing the information in units of super-tracks. The head 150 is arranged in the end portion of the slider 131 (refer to FIG. 1), and remains separated by a predetermined distance with the bit patterned medium 110, due to a hydrodynamic pressure generated between the head 150 and the bit patterned medium 110 which spins at a high speed.

As described above, the bit patterned medium 110 according to the current embodiment may be a recording medium which magnetically or electrically records information. The head 150 corresponding to the bit patterned medium 110 may be a magnetic head which magnetically records/reproduces information, or may be an electric field head which electrically records/reproduces information. The head 150 of FIG. 4 is an example of the magnetic head which magnetically writes/reads the information. The writing head 151 includes a writing pole 152, a return yoke 153, and a coil (not shown). A magnetic field for a writing is emitted from the writing pole 152 by a current supplied to the coil. An emitted magnetic flux flows to the return yoke 153 and forms a magnetic path. The reading sensor 155 is shielded by shield layers 156 and 157 for shielding against a stray field that may cause noise, and MR, GMR, and TMR devices may be used for the reading sensor 155. In the case of the electric field head which electrically writes/reads the information, a writing pole emits an electric field for a writing due to an applied voltage, and a reading sensor detects a resistance change according to a change in electric polarity and reads the recorded information.

In order for the writing head 151 to record information in units of sub-tracks, an effective width $W_w$ of the writing head 151 in the crosstrack direction may be approximately equal to a width of the sub-track 202 (refer to FIG. 3). In FIG. 4, the effective width $W_w$ of the writing head 151 in the crosstrack direction is illustrated as a width of the writing pole 152. However, according to a strength of the magnetic field for the writing, the width of the writing pole 152 and the effective width $W_w$ may differ.

Meanwhile, in order to read information in units of super-tracks by the reading sensor 155, an effective width $W_R$ of the reading sensor 155 in the crosstrack direction may be approximately equal to a width of the sub-track 201 (refer to FIG. 3). That is, the reading sensor 155 in the crosstrack direction is formed to have a width capable of reading bit cell information corresponding to the number of a plurality of sub-tracks, at a single time. In FIG. 4, the effective width $W_R$ is illustrated as the width of the reading sensor 155. However, according to a sensitivity of the reading sensor 155, the width of the reading sensor 155 and the effective width $W_R$ may differ. The reading sensor 155 according to the current embodiment is wider than a conventional reading sensor, and thus, a manufacturing procedure is relatively easy, thereby reducing manufacturing costs. Also, the reading sensor 155 reproduces information in units of super-tracks including the plurality of sub-tracks, thereby having a rapid reproducing speed.

Figure 5:
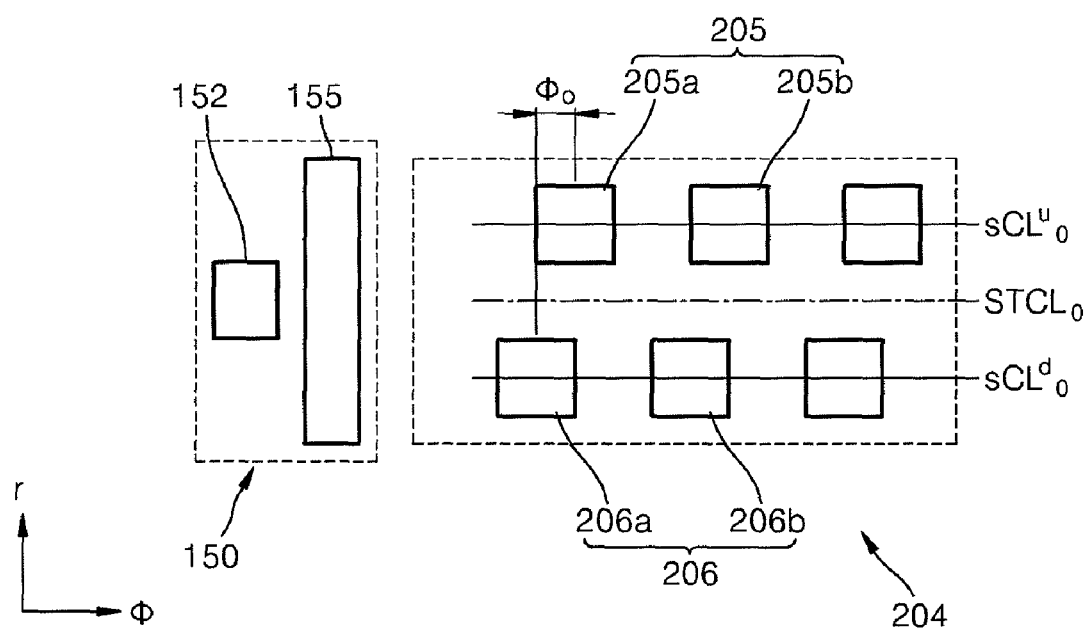
FIG. 5 is a diagram for illustrating a super-track and the head which reads information stored in the super-track.
Figure 6:
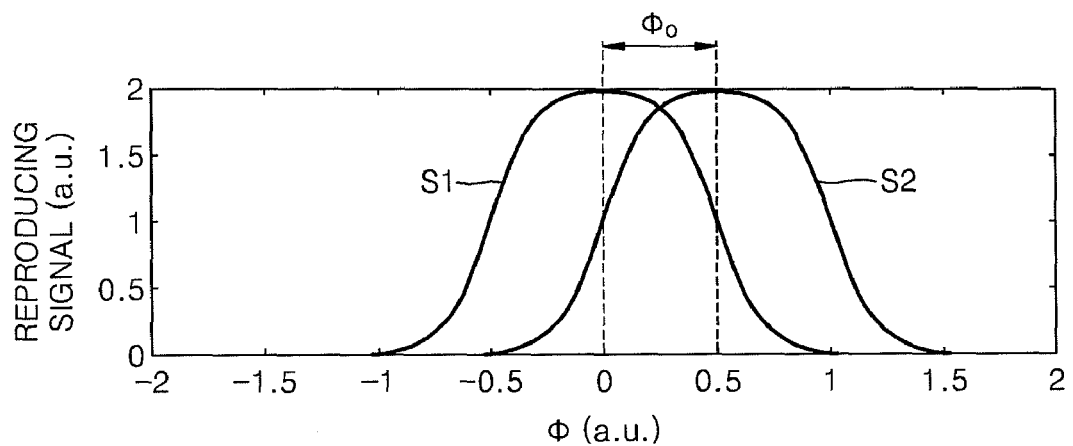
FIG. 6 is a graph of reproducing signals which are respectively generated when information including a + signal is recorded in two bit cells which are adjacent to each other.
Figure 7:
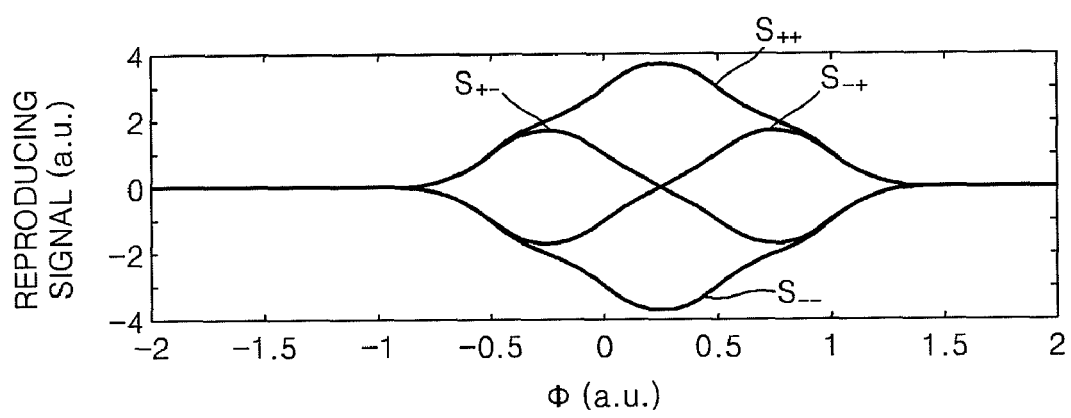
FIG. 7 is a graph of various reproducing signals which are generated by an overlap of information included in two bit cells which are adjacent to each other.

With reference to FIGS. 5 through 7, a detailed structure of the super-track according to the above embodiment and a procedure of reproducing information recorded in the super-track will now be described. FIG. 5 is a diagram for illustrating the super-track 204 and the head 150 which reads information stored in the super-track 204. FIG. 6 is a graph of reproducing signals which are respectively generated when information including a + signal is recorded in two bit cells which are adjacent to each other in the crosstrack direction. FIG. 7 is a graph of various reproducing signals which are generated by an overlap of information included in two bit cells which are adjacent to each other.

Referring to FIG. 5, the $0_{th}$ super-track 204 includes the upper and lower sub-tracks 205 and 206. The upper sub-track 205 includes bit cells 205a and 205b which are equiangularly arranged along the center line $sCL^u{}_0$, and the lower sub-track 206 includes bit cells 206a and 206b which are equiangularly arranged along the center line $sCL^d{}_0$. At this time, the bit cells 205a and 205b formed on the upper sub-track 205 are disposed to deviate from the bit cells 206a and 206b formed on the lower sub-track 206. That is, the bit cells 205a, 206a, 205b, and 206b are disposed such that coordinates, on a circular direction axis ($\Phi$axis) of each center of the bit cells 205a and 205b formed on the upper sub-track 205, and coordinates, on the $\Phi$axis of each center of the bit cells 206a and 206b formed on the lower sub-track 206, deviate from each other by as much as $\Phi_0$. To be more specific, a position of each bit cell can be denoted as a coordinate $\Phi$ on $\Phi$axis in each sub-track. In this regard, $\Phi$ axis coordinates of each center of the bit cells 206a and 206b formed on the lower sub-track 206 are different from $\Phi$axis coordinates of each center of the bit cells 205a and 205b formed on the upper sub-track 205. For example, in the current embodiment, in the case where a length of each bit cell in the $\Phi$axis is 1, the $\Phi$axis coordinates of each center of the bit cells 205a and 205b formed on the upper sub-track 205 may be disposed so as to deviate from the $\Phi$axis coordinates of each center of the bit cells 206a and 206b formed on the lower sub-track 206, as much as 0.5. In the current embodiment, the super-track 204 includes two sub-tracks. However, the present invention is not limited thereto, and the super-track 204 according to the present invention may include more than two sub-tracks.

With respect to the super-track 204 having the aforementioned structure, the head 150 reads information stored in the super-track 204, along the center line $STCL_0$. At this time, as illustrated in FIG. 5, the reading sensor 155 has a width capable of covering the sub-tracks 205 and 206. FIG. 6 illustrates reproducing signals S2 and S1 which are read via the reading sensor 155, with respect to the bit cells 205a and 206a which are adjacent to each other in the crosstrack direction. The reproducing signals S1 and S2 illustrated in FIG. 6 correspond to the case in which a + signal is recorded in each of the bit cells 205a and 206a. Referring to FIG. 6, a signal peak point of the reproducing signal S1 of the bit cell 206a of the lower sub-track 206 that is first read, and the reproducing signal S2 of the bit cell 205a of the upper sub-track 205 that is later read have a phase-difference corresponding to $\Phi_0$. An actually read reproducing signal will be a sum signal of the reproducing signal S2 of the bit cell 205a and the reproducing signal S1 of the bit cell 206a. Sum signals, corresponding to the case where information recorded in the bit cells 205a and 206a has various combinations with a + signal and a − signal, are illustrated in FIG. 7. In FIG. 7, a sum signal S++ corresponds to the case in which +signal is recorded in each of the bit cells 205a and 206a. A sum signal $S_{+-}$ corresponds to the case in which a + signal and a − signal are respectively recorded in the bit cells 205a and 206a. A sum signal $S_{-+}$ corresponds to the case in which a −signal and a +signal are respectively recorded in the bit cells 205a and 206a. A sum signal $S_{--}$ corresponds to the case in which a − signal is recorded in each of the bit cells 205a and 206a. As illustrated in FIG. 7, the sum signals $S_{++}$, $S_{+-}$, $S_{-+}$, and $S_{--}$, which are generated by an overlap of reproducing signals which are read by each of the bit cells 205a and 206a, have a different overlap pattern. Thus, the sum signals $S_{++}$, $S_{+-}$, $S_{-+}$, and $S_{--}$ may read information stored in each of the bit cells 205a and 206a.

Figure 8:
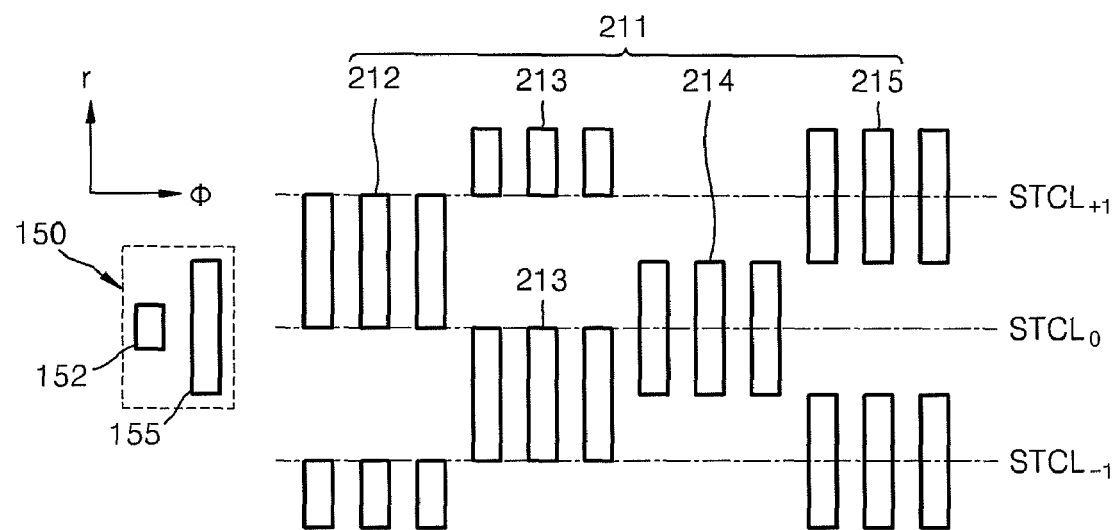
FIG. 8 is a diagram of a servo burst and the head detecting the servo burst, which are illustrated so as to describe a method of tracking a track during reproduction.
Figure 9:
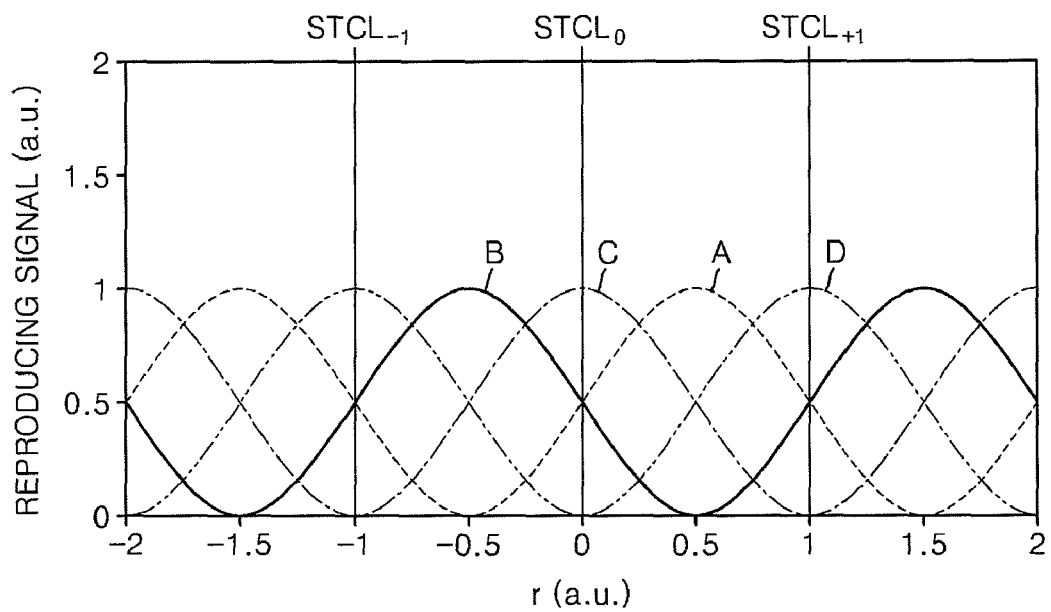
FIG. 9 is a diagram of burst signals with respect to an off-track amount.
Figure 10A:
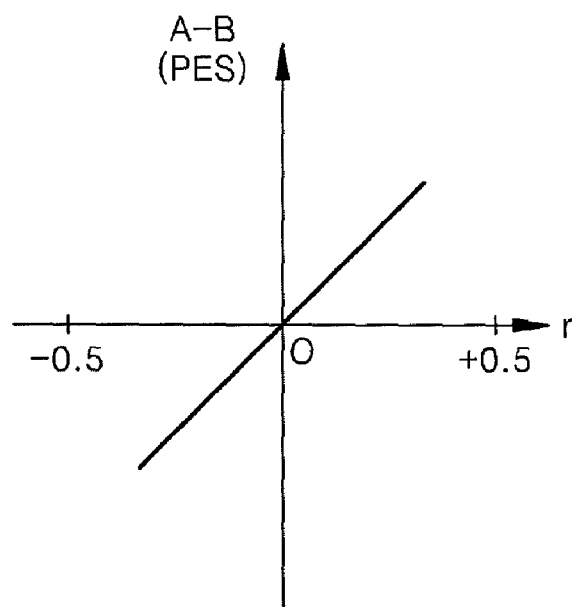
FIGS. 10A and 10B are graphs of a difference signal and a position error signal, which are of burst signals detected by two adjacent super-tracks.
Figure 10B:
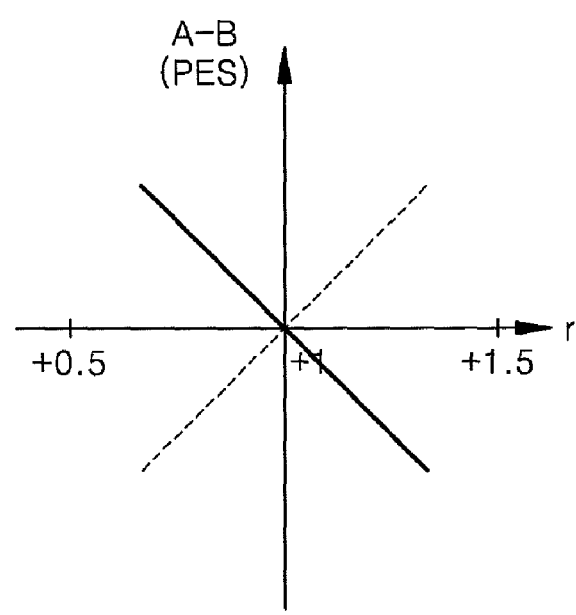
Figure 11:
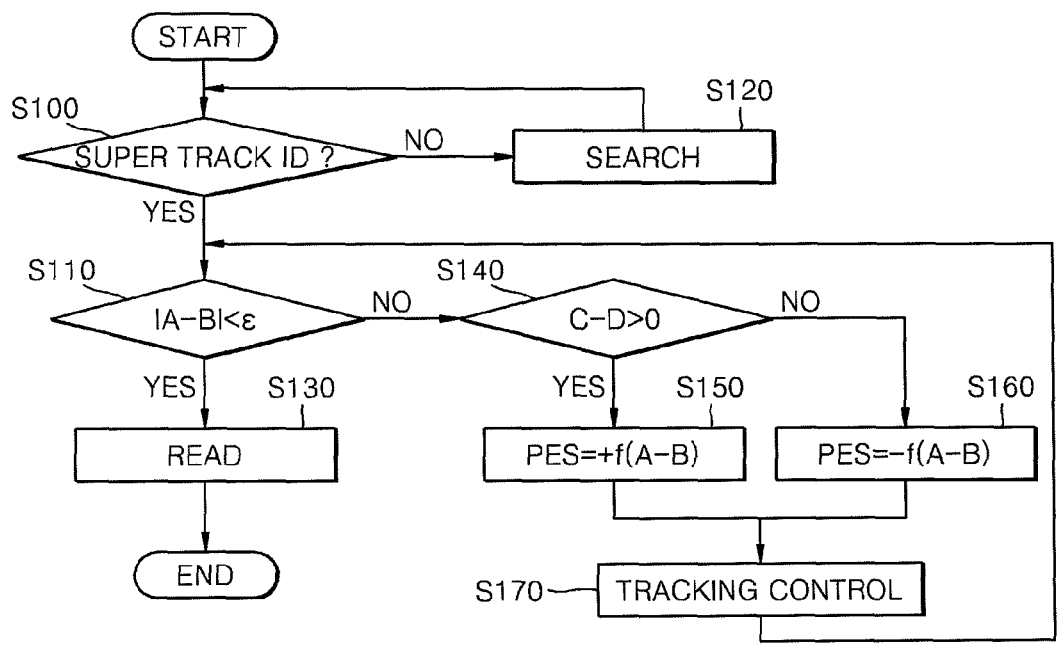
FIG. 11 is a flowchart of the method of tracking the track during reproduction.

With reference to FIGS. 8 through 11, a method of tracking a track (super-track) during reproduction will now be described. FIG. 8 is a diagram of the servo burst 211 and the head 150 for detecting the servo burst 211, which are illustrated so as to describe the method of tracking the track during reproduction. FIG. 9 is a diagram of burst signals with respect to an off-track amount. FIGS. 10A and 10B are graphs of a difference signal and a position error signal, which are of burst signals detected by two adjacent super-tracks. FIG. 11 is a flowchart of the method of tracking the track during reproduction.

As illustrated in FIG. 8, in the case where the head 150 is positioned in the center line $STCL_0$ of the $0_{th}$ super-track 204 (refer to FIG. 3), a burst signal read by the reading sensor 155 is a signal covering some of the A burst 212, some of the B burst 213, all of the C burst 214. Such a burst signal may change when a position of the head 150 moves in the crosstrack direction, that is, the radial direction (r). A change in the burst signal with respect to the radial direction (r) is illustrated in FIG. 9. The horizontal axis of FIG. 9 represents the position of the head 150 in the radial direction (r), and means an off-track amount with respect to the center lines $STCL_0$, and $STCL_{\pm 1}$ of each super-track. Meanwhile, the vertical axis of FIG. 9 represents sizes of the burst signals. In FIG. 9, a position of the center line $STCL_0$ of the $0_{th}$ super-track 204 (refer to FIG. 3) is referred to as a reference position 0 in the radial direction (r), a position of the center line $STCL_{+1}$ of the +1th super-track 207 (refer to FIG. 3) is referred to as +1, and a position of the center line $STCL_{-1}$ of the $-1_{th}$ super-track 201 (refer to FIG. 3) is referred to as −1. As illustrated in FIG. 9, A burst signal has a minimum at a position of −0.5 in the radial direction (r), and has a maximum at a position of +0.5 in the radial direction (r). A B burst signal has a maximum at the position of −0.5, and has a minimum at the position of ±0.5. Meanwhile, a C burst signal has a maximum at a position of 0 in the radial direction (r), and has a minimum at a position of ±1 in the radial direction (r). A D burst signal has a minimum at the position of 0, and has a maximum at the position of ±1.

Referring to FIG. 10A, a difference signal A−B between the A burst signal and the B burst signal (hereinafter, referred to as difference signal A−B) has a positive linear relationship with an off-track amount in the position of 0 in the radial direction (r), that is, in the vicinity of the center line $STCL_0$.

In other words, how much the head 150 (refer to FIG. 8) is off-tracked in the vicinity of the center line $STCL_0$ of the $0_{th}$ super-track 204 (refer to FIG. 3) may be easily detected by using the difference signal A–B, and thus, the difference signal A–B tracks the $0_{th}$ super-track 204 by using a position error signal.

Meanwhile, referring to a solid line of FIG. 10B, the difference signal A–B has a negative linear relationship with the off-track amount in the position of +1 in the radial direction (r), that is, in the vicinity of the center line $STCL_{+1}$. In other words, how much the head 150 is off-tracked in the vicinity of the $+1_{th}$ super-track 207, that is, a position error signal may be obtained by multiplying a minus by the difference signal A–B, as illustrated in a dotted line of FIG. 10B.

As illustrated in FIGS. 10A and 10B, the position error signal with respect to the super-track may be obtained from the difference signal A–B. However, the position error signal representing the off-track amount is divided into a positive correlation and a negative correlation, with respect to the difference signal A–B, depending on a relationship between an adjacent super-track. For example, an even super-track has the positive correlation with respect to the difference signal A–B, and an odd super-track has the negative correlation with respect to the difference signal A–B. This is because the period, in which the burst pattern repeats, is twice as wide as the super-track. The case of FIG. 10B, in which the minus and the difference signal A–B are multiplied, may be determined from the C burst signal and the D burst signal. For example, a difference signal C–D between the C burst signal and the D burst signal (hereinafter, referred to as difference signal C–D) always has a positive value in the vicinity of the center line $STCL_0$ of the $0_{th}$ super-track 204, and always has a negative value in the vicinity of the center lines $STCL_{\pm}1$ of the $\pm_{th}$ super-tracks 201 and 207. Therefore, a position error signal $PES_{ST}$ with respect to the super-track can be obtained according to Equation 1 below.

$$PES_{ST}=\text{sign}(C-D)\times(A-B) \quad \text{[Equation 1]}$$

Here, sign(C–D) represents a sign of the difference signal C–D.

As described above, the method of tracking the track during reproduction may be performed by using the difference signal A–B. With reference to FIG. 11, the method of tracking the track will now be described.

First, an ID of a super-track is detected so as to check whether the super-track is a super-track from which information should be read (operation S100). If the super-track is a desired super-track, a track tracking operation is started. However, if the super-track is not the desired super-track, another super-track is searched for (operation S120). In the track tracking operation, an A burst signal and a B burst signal are read first, and then a difference signal A–B thereof is checked to determine whether the difference signal A–B is within a predetermined allowable range ($\epsilon$) (operation S110). If the difference signal A–B is within the predetermined allowable range ($\epsilon$), a reading operation is performed (operation S130). If the difference signal A–B is beyond the predetermined allowable range ($\epsilon$), a sign of a difference signal C–D between a C burst signal and a D burst signal is determined (operation S140). As a result of the determination, if the difference signal C–D is a positive number, the difference signal A–B is determined to be a position error signal (operation S150). As a result of the determination, if the difference signal C–D is a negative number, the position error signal is obtained by multiplying a minus by the difference signal A–B (operation S160). After that, tracking control is started (operation S170).

In the current embodiment, the position error signal is obtained according to only the difference signal A–B, but the present invention is not limited thereto. The position error signal may be modified by varying the combination of the A, B, C, and D bursts with respect to signals, so that linearity with respect to the off-track amount may be enhanced or a signal processing may be more easily performed. Furthermore, a burst pattern is not limited to the A, B, C, and D bursts but may include more bursts. Otherwise, the types of bursts may vary a little.

Figure 12:
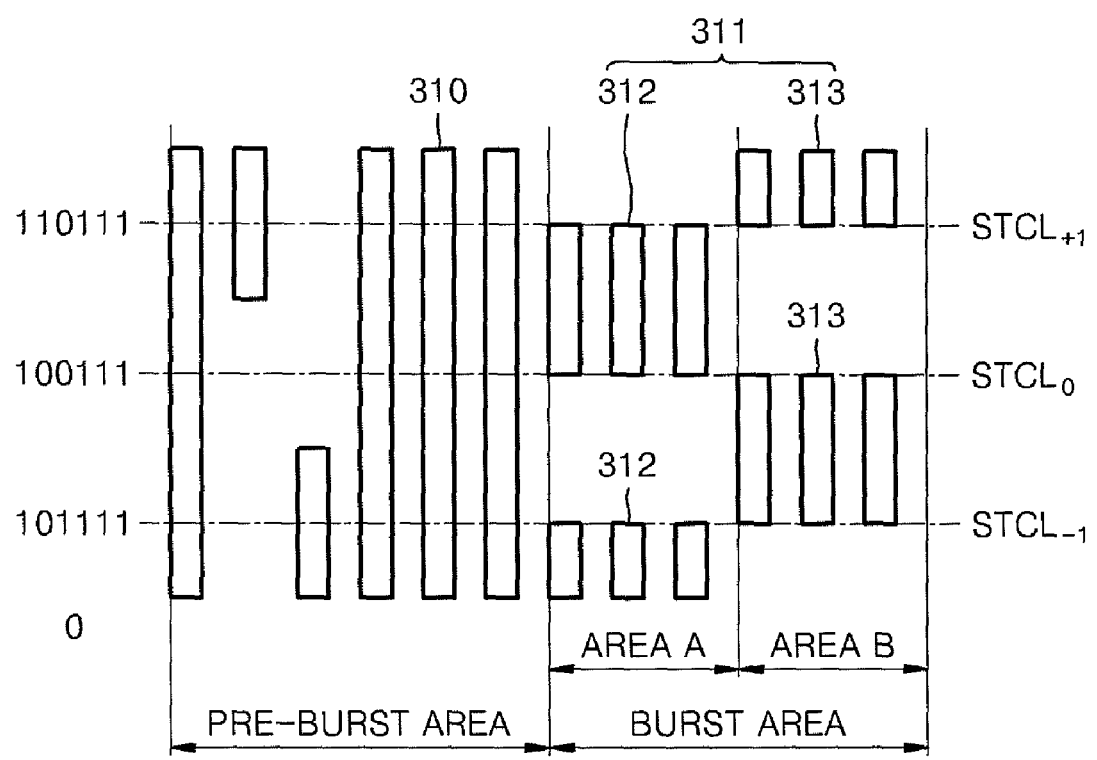
FIG. 12 is a modified embodiment of a burst pattern related to the servo area of FIG. 4 according to another embodiment of the present invention.

FIG. 12 is a modified embodiment of the burst pattern according to another embodiment of the present invention. In the modified embodiment, a servo burst 311 includes only A and B bursts 312 and 313. Here, the A and B bursts 312 and 313 are practically the same as the A and B bursts 212 and 213 in FIG. 3. However, compared to the previous embodiment, the modified embodiment does not include C and D bursts. As described above, a difference signal A–B between the A burst signal and the B burst signal may be used to track a super-track.

Meanwhile, unlike the previous embodiment, the case of FIG. 10B in which the minus and the difference signal A–B are multiplied may be obtained via a track ID. A track ID 310 according to the current embodiment is formed according to Gray code which makes a binary number. The gray code has a rule in which two successive values differ in only one digit. Such a gray code binary number differs in only one bit with respect of an adjacent super-track. Thus, a Hamming weight representing the number of 1s that switch between an even number and an odd number. Thus, in the case where an even super-track has a positive linear relationship with the difference signal A–B and an odd super-track has a negative linear relationship with the difference signal A–B, a position error signal constantly having a positive correlation with respect to an off-track amount may be obtained by multiplying the Hamming weight by the difference signal A–B.

Figure 13:
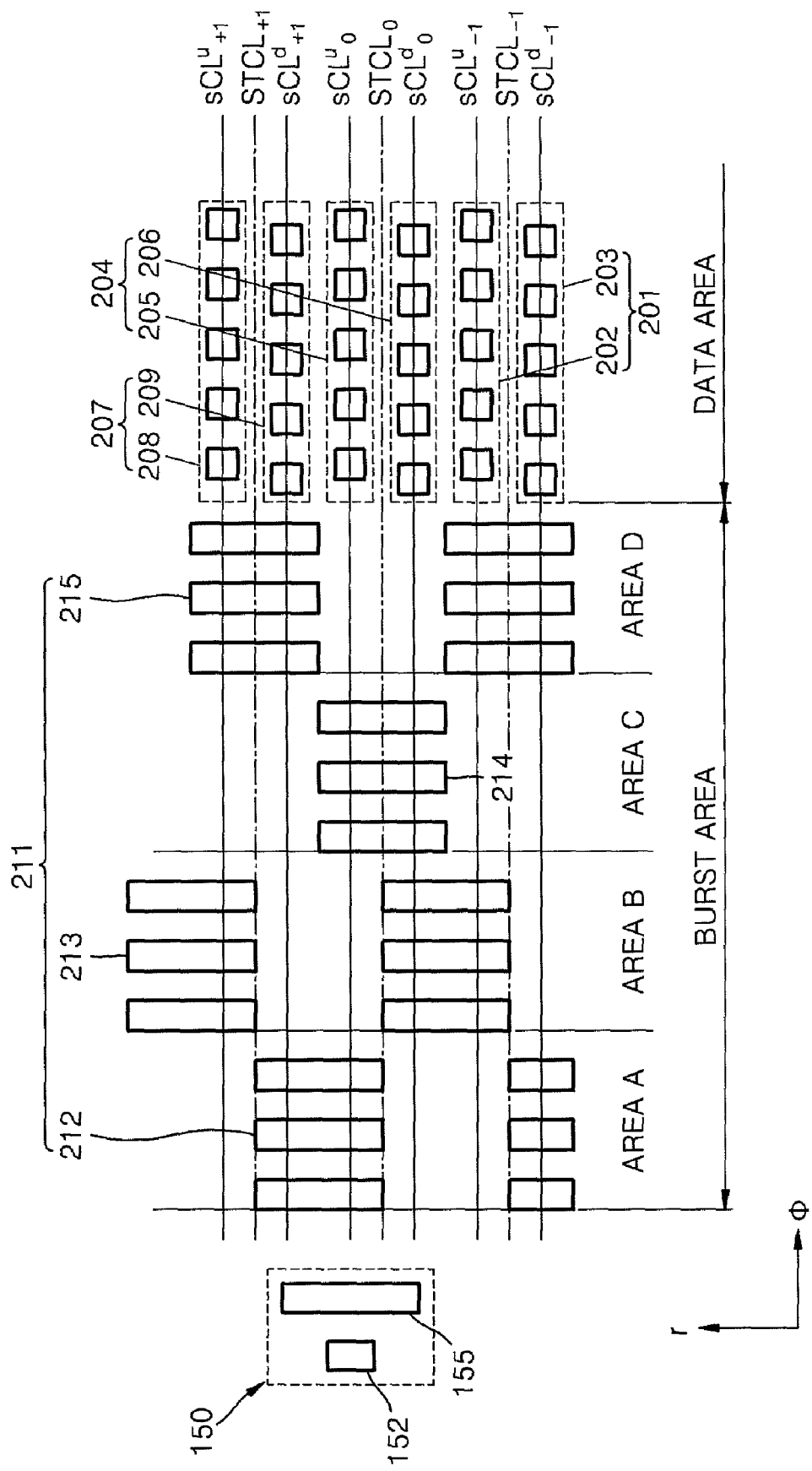
FIG. 13 is a diagram of the servo burst, super-tracks, and the head which are illustrated so as to describe a method of tracking a track during recording.
Figure 14:
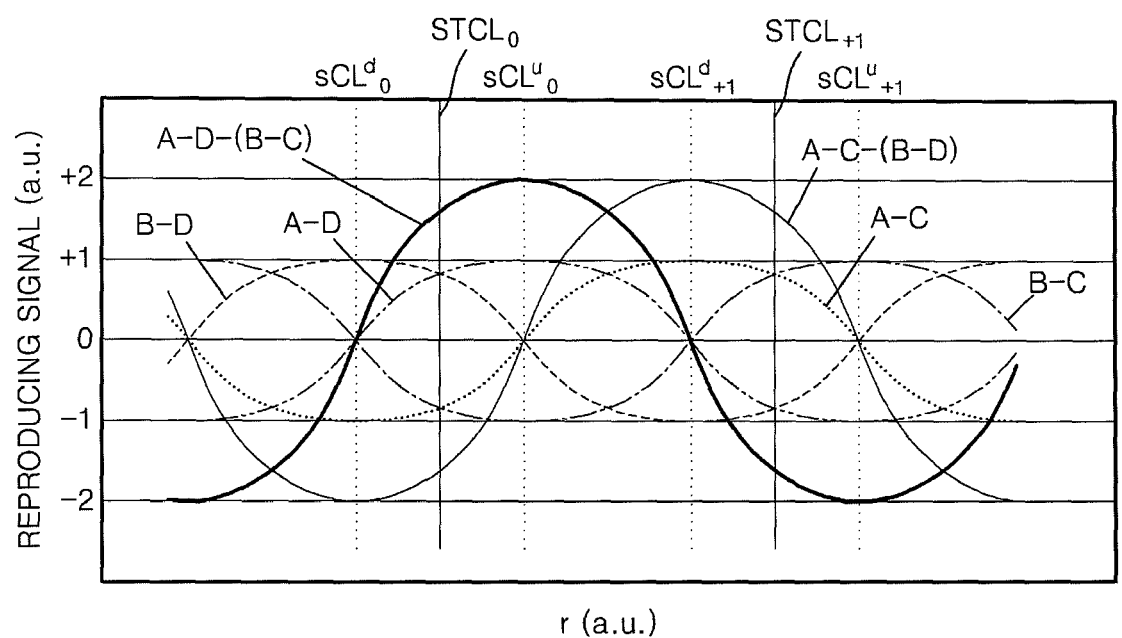
FIG. 14 is a diagram of burst signals according to various combinations with respect to an off-track amount.
Figure 15A:
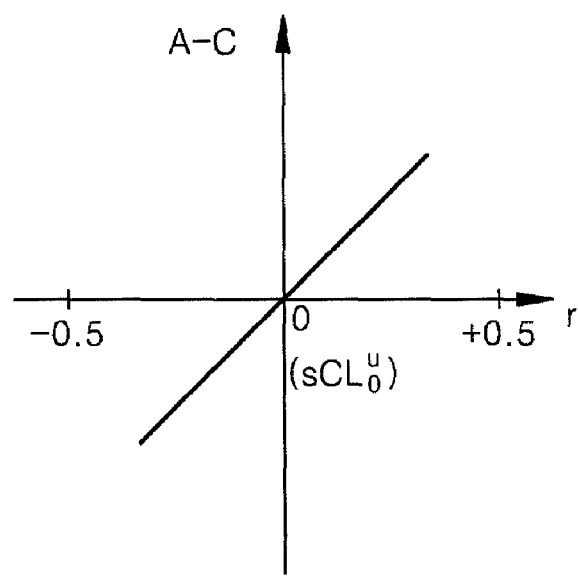
FIGS. 15A through 15D are diagrams of burst signals combined so as to track a sub-track.
Figure 15B:
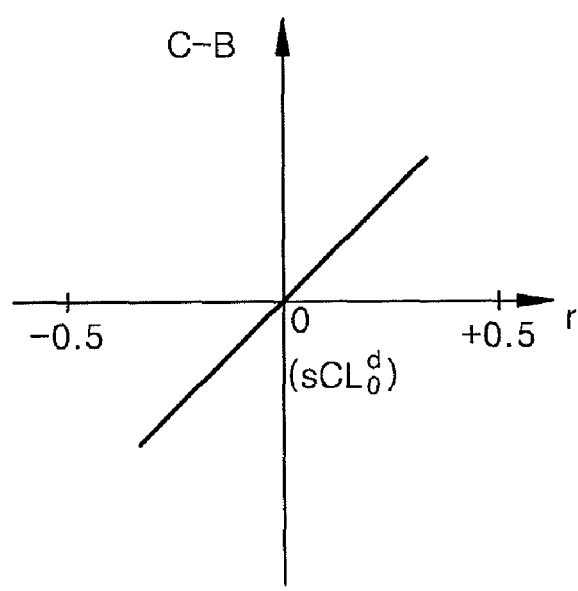
Figure 15C:
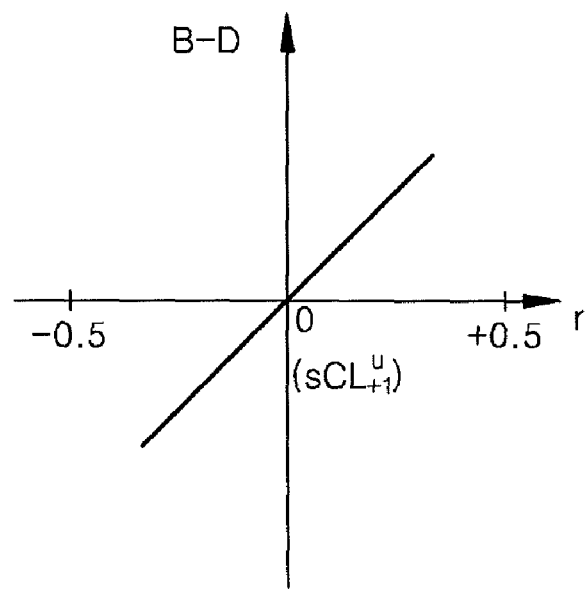
Figure 15D:
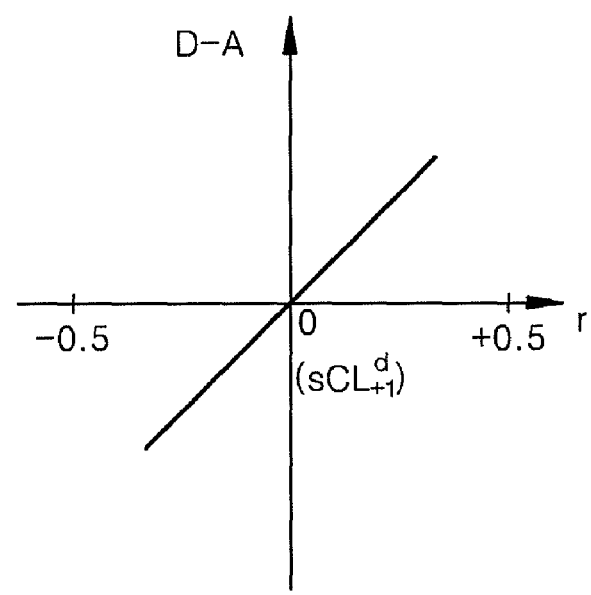
Figure 16:
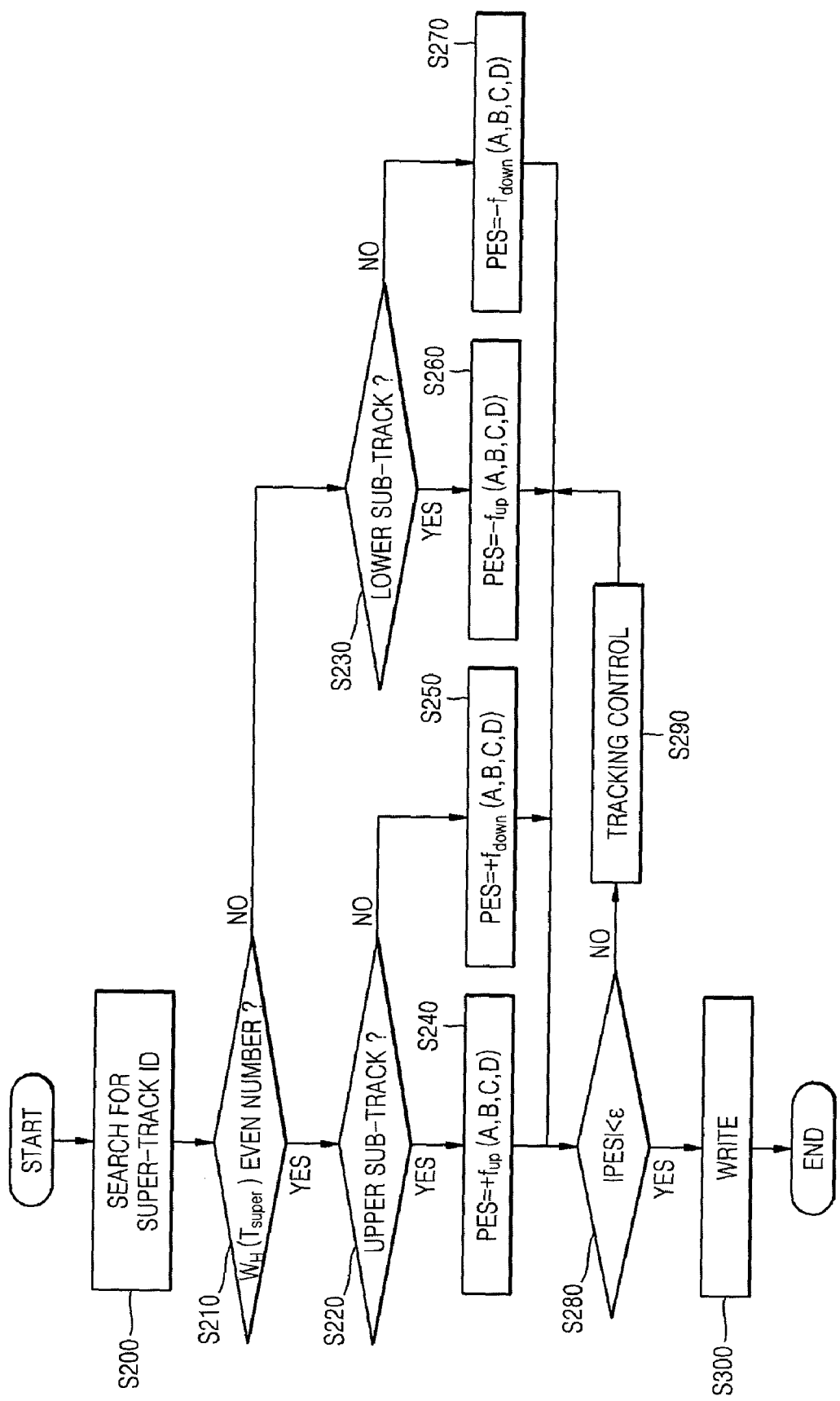
FIG. 16 is a flowchart of the method of tracking the track during recording.

With reference to FIGS. 13 through 16, a method of tracking a track (sub-track) during recording will now be described. FIG. 13 is a diagram of the servo burst 211, the super-tracks 201, 204, and 207, and the head 150, which are illustrated so as to describe the method of tracking the track during recording. FIG. 14 is a diagram of burst signals according to various combinations with respect to an off-track amount. FIGS. 15A through 15D are diagrams of burst signals combined so as to track the sub-track. FIG. 16 is a flowchart of the method of tracking the track during recording.

In order to record information in the bit patterned medium 110 according to the previous embodiment, the head 150 has to track the sub-track. As illustrated in FIG. 13, when the head 150 is on the center line $sCL''_0$ of the upper sub-track 205 of the $0_{th}$ super-track 204, a burst signal read by the reading sensor 151 covers approximately three quarters of the A burst 212, approximately a quarter of the B burst 213, approximately three quarters of the C burst 214, and approximately a quarter of the D burst 215. At this time, a difference signal A–C between an A burst signal and a C burst signal is 0, and a difference signal B–D between a B burst signal and a D burst signal is also 0. Such a burst signal may become different when a position of the head 150 moves in the crosstrack direction, that is, in the radial direction (r). A change in the burst signal with respect to the radial direction (r) is illustrated in FIG. 14.

The horizontal axis of FIG. 14 represents the position of the head 150 (refer to FIG. 13) in radial direction (r), and means an off-track amount with respect to each track. Meanwhile, the vertical axis of FIG. 14 represents sizes of the burst signals according to the various combinations. Referring to FIG. 14, the difference signal A–C is 0 in the center line $sCL^u_0$ of the upper sub-track 205 of the $0_{th}$ super-track 204, and has a positive linear relationship with the off-track amount in the vicinity of the center line $sCL^u_0$. Also, the difference signal A–C is 0 in the center line $sCL^u_{+1}$ of the upper sub-track 208 of the $+1_{th}$ super-track 207, and has a negative linear relationship with the off-track amount in the vicinity of the center line $sCL^u_{+1}$.

As illustrated in FIG. 14, the combinations of the burst signals, which have a linear relationship with the off-track amount, exist in the vicinity of the center lines $sCL^u_0$, $sCL^d_0$, $sCL^u_{+1}$, and $sCL^d_{+1}$ of each sub-track. Thus, a track tracking operation with respect to the sub-track may be performed by using the combinations of the burst signals.

FIGS. 15A through 15D are diagrams for respectively indicating difference signals A–C, C–B, B–D, and D–A of the burst signals in the center lines $sCL^u_0$, $sCL^d_0$, $sCL^u_{+1}$, and $sCL^d_{+1}$ of each sub-track. As illustrated in the diagrams, the difference signals A–C, C–B, B–D, and D–A of the burst signals have the positive linear relationship in the vicinity of the center lines $sCL^u_0$, $sCL^d_0$, $sCL^u_{+1}$, and $sCL^d_1$ of each sub-track. Thus, each sub-track may be tracked by using the difference signals A–C, C–B, B–D, and D–A as a position error signal.

Referring back to FIG. 14, the difference signal A–C has the negative linear relationship with the off-track amount in the vicinity of the center line $sCL^u_{+1}$ of the upper sub-track 208 of the $+1_{th}$ super-track 207, and thus, the difference signal A–C has to be multiplied by a minus so as to be used for tracking the upper sub-track 208. As illustrated in FIG. 14, the difference signals A–C, C–B, B–D, and D–A of the burst signals are repeated according to a period that is twice a track width of a super-track. Thus, a sign, which makes the difference signals A–C, C–B, B–D, and D–A of the burst signals have the positive linear relationship with the off-track amount, differs depending on an even super-track and an odd super-track. Such a sign may be determined by using a difference signal C–D or by using the Hamming weight of a track ID, as previously described in relation to the method of tracking the super-track during reproduction.

Meanwhile, whether a sub-track, where the head 150 is positioned, is an upper sub-track or a lower sub-track may be determined from the sign of the difference signals A–C, C–B, B–D, and D–A of the burst signals. For example, in the vicinity of the center line $sCL^u_0$ of the upper sub-track 205 of the $0_{th}$ super-track 204, the difference signal A–D is always a positive number, and the difference signal B–C is always a negative number. Also, in the vicinity of the center line $sCL^d_0$ of the lower sub-track 206 of the $0_{th}$ super-track 204, the difference signal B–D is always a positive number, and the difference signal A–C is always a negative number. However, the difference signal A–D is always a negative number in the vicinity of the center line $sCL^u_{+1}$ of the upper sub-track 208 of the $+1_{th}$ super-track 207, and the difference signal B–D is always a negative number in the vicinity of the center line $sCL^d_{+1}$ of the lower sub-track 208 of the $+1_{th}$ super-track 207. The sign of the difference signals A–C, C–B, B–D, and D–A of the burst signals may differ depending on such odd super-tracks and even super-tracks. Thus, whether the sub-track, where the head 150 is positioned, is the upper sub-track or the lower sub-track may be determined by considering the track ID of the super-track together with the sign of the difference signals A–C, C–B, B–D, and D–A of the burst signals.

As described above, the method of tracking the track during recording by the head 150 may be performed by using the various combinations of the burst signals. With reference to FIG. 16, the method of tracking the track during recording will now be described.

First, a track ID of a super-track including a target recording sub-track is searched for (operation S200). Next, whether a corresponding super-track is an even super-track or an odd super-track is determined by using the Hamming weight of the searched for track ID of the super-track (operation S210). In the case where the Hamming weight is an even number, a super-track is referred to as the even super-track, for convenience of description. Next, whether the target recording sub-track is an upper sub-track or a lower sub-track is determined from a sign of combined burst signals (operations S220 and S230). In the case where the combined burst signals are combined identically to the burst signals of FIG. 14, if the target recording sub-track is defined as a sub-track in the even super-track such as the $0_{th}$ super-track 204, the corresponding target recording sub-track is defined as the upper sub-track in the even super-track when the difference signal A–D is the positive number and the difference signal B–C is the negative number. In this manner, after obtaining information about whether the super-track including the target recording sub-track is the even super-track or the odd super-track and information about whether the target recording sub-track is the upper sub-track or the lower sub-track, as illustrated in FIGS. 14 through 15D, a position error signal appropriate for the target recording sub-track may be obtained by the combinations of the burst signals (operations S240, S250, S260, and S270).

Next, whether the detected position error signal is within a predetermined allowable range ($\epsilon$) is determined, and a writing operation is started if the position error signal is sufficiently small (operation S300). If the position error signal is beyond the predetermined allowable range ($\epsilon$), a tracking control is performed (operation S290). After that, when the position error signal is within the predetermined allowable range ($\epsilon$), the writing operation is started (operation S300).

The bit patterned medium according to the present invention includes a super-track comprised of a plurality of sub-tracks, and bit cells on each of the plurality of sub-tracks are arranged so as to deviate from each other. According to such a structure, the bit patterned medium can read a plurality of pieces of information stored in the bit cells, at one time and can separate the plurality of pieces of information. Thus, the bit patterned medium is appropriate for a recording medium for realizing a high density recording. The bit patterned medium according to the above embodiments includes a super-track comprising two sub-tracks, but the number of sub-tracks is not limited to this and can be increased. When the number of sub-tracks is increased, a reproducing speed becomes faster accordingly, but a procedure of separating information of the sub-tracks from information of the super-track read by the reading sensor may become more complicated. Thus, in consideration of this problem, the bit patterned medium may be formed to have a sufficient number of sub-tracks.

A bit patterned medium having a super-track, an appropriate method of tracking a track of the bit patterned medium, a head, and an information recording/reproducing apparatus including the bit patterned medium and the head according to the present invention have been described with reference to exemplary embodiments thereof. However, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A bit patterned medium comprising:
   a substrate; and
   a recording layer comprised of a plurality of bit cells which are formed on the substrate by being magnetically separated from each other,
   wherein a surface of the recording layer is divided into a data area and a servo area,
   wherein the data area comprises a super-track comprised of a plurality of sub-tracks, wherein bit cells formed on a sub-track from among the plurality of sub-tracks in the super-track are disposed so as to deviate from bit cells formed on another sub-track from among the plurality of sub-tracks in the super-track,
   wherein the servo area comprises a track identification (ID) including an information identifying the super-track, and a servo burst including an information of a position error signal for tracking the super-track, and
   wherein the servo burst comprises a plurality of bursts which are formed deviating from each other in a crosstrack direction, along a center line of the super track.

2. The bit patterned medium of claim 1, wherein a width of each of the plurality of bursts in the crosstrack direction is equal to a track width of the super-track.

3. The bit patterned medium of claim 1, wherein a width of each of the plurality of bursts in the crosstrack direction is equal to a track width of each of the plurality of sub-tracks.

4. The bit patterned medium of claim 1, wherein the servo burst comprises combined bursts whereby difference signals of the bursts become 0 when the head reading information is on the center line of the super-track.

5. The bit patterned medium of claim 4, wherein the servo burst further comprises combined bursts whereby signs of difference signals of the bursts are inverse to each other when the head off-tracks in a direction different from the center line of the super-track.

6. The bit patterned medium of claim 4, wherein the servo burst comprises combined bursts whereby difference signals of the bursts become 0 when the head reading information is on a center line of the sub-track.

7. The bit patterned medium of claim 1, wherein the track ID is coded whereby a difference of a Hamming weight of the track ID of the adjacent super-track is an odd number.

8. The bit patterned medium of claim 1, wherein an information surface of the recording layer is divided into one or more sectors,
   the one or more sectors respectively comprise a data area comprising the super-track in which user data is recorded, and a servo area in which the track ID and the servo burst are recorded.

9. The bit patterned medium of claim 1, wherein, when the number of the plurality of sub-tracks in the super-track is N,
   N bit cells, which are adjacent to each other in the crosstrack direction in the super-track, are disposed whereby reproducing signals due to information of each of the N bit cells overlap each other, and have a phase difference, and
   an interval in a downtrack direction between each of the N bit cells, which are adjacent to each other in the crosstrack direction, is set whereby $2^N$ overlapping signals due to combinations of the information stored in the N bit cells have different overlapping patterns when the information stored in the N bit cells is read.

10. The bit patterned medium of claim 9, wherein an interval between each of bit cells, which are adjacent to each other in the downtrack direction, is uniform in each of the plurality of sub-tracks.

11. The bit patterned medium of claim 10, wherein lengths of the bit cells, in the downtrack direction, are all uniform.

12. The bit patterned medium of claim 11, wherein, when each of the lengths of the bit cells in the downtrack direction is $\Delta\phi$, the interval in the downtrack direction between each of the N bit cells which are adjacent to each other in the crosstrack direction is $\Delta\phi/N$.

13. The bit medium of claim 1, wherein the recording layer is made of a magnetic material for magnetic recording or is made of a ferroelectric material for electric recording.

14. A method of tracking a track by a head with respect to the bit patterned medium of claim 1, the method comprising:
    detecting the track ID and recognizing a super-track in which the head is positioned;
    detecting a position error signal from a servo burst; and
    performing a tracking control of the head by using the position error signal.

15. The method of claim 14, in a recording mode, further comprising recognizing a sub-track in the super-track,
    wherein the position error signal is detected from combined bursts whereby difference signals of the bursts become 0 when the head is on a center line of the sub-track in the super-track, and
    the tracking control is performed whereby the head is on the center line of the sub-track.

16. The method of claim 15, wherein the recognizing of the sub-track comprises recognizing the sub-track by using position error signals detected from combined bursts whereby signs of position error signals, combined when the head positions at different sub-tracks in the super-track, are inverse to each other.

17. The method of claim 14, wherein, in a reproducing mode,
    the position error signal is detected from combined bursts whereby difference signals of the bursts become 0 when the head is on a center line of the super-track, and
    the tracking control is performed whereby the head is on the center line of the super-track.

18. A head recording information in the bit patterned medium of claim 1 and reading the recorded information, the head comprising:
    a writing head recording the information by a unit of the sub-track; and
    a reading sensor reproducing the information by a unit of the super-track.

19. The head of claim 18, wherein an effective width of the writing head in a crosstrack direction is equal to a width of the sub-track, and an effective width of the reading sensor in the crosstrack direction is equal to a whole width of sub-tracks in the super-track.

20. The head of claim 18, wherein the head is a magnetic head which records/reproduces information by a magnetic method, or is an electric field head which records/reproduces information by an electric field method.

21. An information recording/reproducing apparatus comprising:
    the bit patterned medium of claim 1;
    a head comprising a writing head recording information in the bit patterned medium in units of sub-tracks and a reading sensor reproducing information in the bit patterned medium in units of super-tracks; and a control unit controlling the head whereby the head is positioned in a center line of the sub-track during recording and the head is positioned in a center line of the super-track during reproduction.

22. The information recording/reproducing apparatus of claim 21, wherein an effective width of the writing head of the head in a crosstrack direction is equal to a width of the sub-track, and an effective width of the reading sensor of the head in the crosstrack direction is equal to a whole width of sub-tracks in the super-track.

23. The information recording/reproducing apparatus of claim 21, wherein the information recording/reproducing apparatus is a magnetic recording apparatus which records/reproduces information by a magnetic method, or is an electric field recording apparatus which records/reproduces information by an electric field method.

* * * * *